(12) United States Patent
Aoki

(10) Patent No.: US 10,848,952 B2
(45) Date of Patent: Nov. 24, 2020

(54) COMMUNICATION APPARATUS, CONTROL METHOD OF THE SAME, AND NON-TRANSITORY COMPUTER-READABLE STORAGE MEDIUM

(71) Applicant: CANON KABUSHIKI KAISHA, Tokyo (JP)

(72) Inventor: Hitoshi Aoki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/015,433

(22) Filed: Jun. 22, 2018

(65) Prior Publication Data

US 2018/0310160 A1  Oct. 25, 2018

Related U.S. Application Data

(63) Continuation of application No. PCT/JP2016/083302, filed on Nov. 10, 2016.

(30) Foreign Application Priority Data

Jan. 19, 2016 (JP) .................................. 2016-008290

(51) Int. Cl.
H04W 8/00 (2009.01)
H04W 84/20 (2009.01)
H04W 84/12 (2009.01)

(52) U.S. Cl.
CPC ........... *H04W 8/005* (2013.01); *H04W 84/20* (2013.01); *H04W 84/12* (2013.01)

(58) Field of Classification Search
None
See application file for complete search history.

(56) References Cited

U.S. PATENT DOCUMENTS 9,143,979 B1  9/2015  Lambert
10,064,042 B2  8/2018  Aoki
(Continued)

FOREIGN PATENT DOCUMENTS

WO  2014/176079 A1  10/2014

OTHER PUBLICATIONS

PCT International Search Report and the Written Opinion dated Dec. 6, 2016, in International Application No. PCT/JP2016/083302.
Hitoshi Aoki, U.S. Appl. No. 15/779,684, filed May 29, 2018.

*Primary Examiner* — Diane L Lo
(74) *Attorney, Agent, or Firm* — Venable LLP

(57) ABSTRACT

A communication apparatus receives a first acquisition request, which is a request for acquiring apparatus information relating to another communication apparatus that exists in a NAN (Neighbor Awareness Networking) cluster, from a first other communication apparatus, transmits, in a case where the first acquisition request is received, a second acquisition request that corresponds to the first acquisition request to the cluster, and awaits reception of signals from a plurality of other communication apparatuses in response to the transmitted second acquisition request, for a predetermined period. In addition, a signal is transmitted which includes pieces of apparatus information of the plurality of other communication apparatuses that are included in the signals received from the plurality of other communication apparatuses collectively to the first other communication apparatus.

15 Claims, 9 Drawing Sheets

(56) References Cited

U.S. PATENT DOCUMENTS

| | | | |
|---|---|---|---|
| 2014/0302787 A1 | 10/2014 | Rantala et al. | |
| 2015/0131529 A1* | 5/2015 | Zhou | H04W 84/18 370/328 |
| 2015/0319675 A1* | 11/2015 | Park | H04W 48/16 370/338 |
| 2016/0112986 A1* | 4/2016 | Patil | H04W 48/16 455/515 |
| 2016/0127996 A1* | 5/2016 | Patil | H04W 48/16 370/311 |
| 2016/0157089 A1* | 6/2016 | Qi | H04W 76/27 370/254 |
| 2016/0165653 A1* | 6/2016 | Liu | H04L 67/325 370/329 |
| 2016/0345242 A1* | 11/2016 | Kim | H04W 48/16 |
| 2018/0146450 A1* | 5/2018 | Li | H04W 8/005 |
| 2018/0213387 A1 | 7/2018 | Aoki | |
| 2018/0332459 A1 | 11/2018 | Aoki | |

* cited by examiner

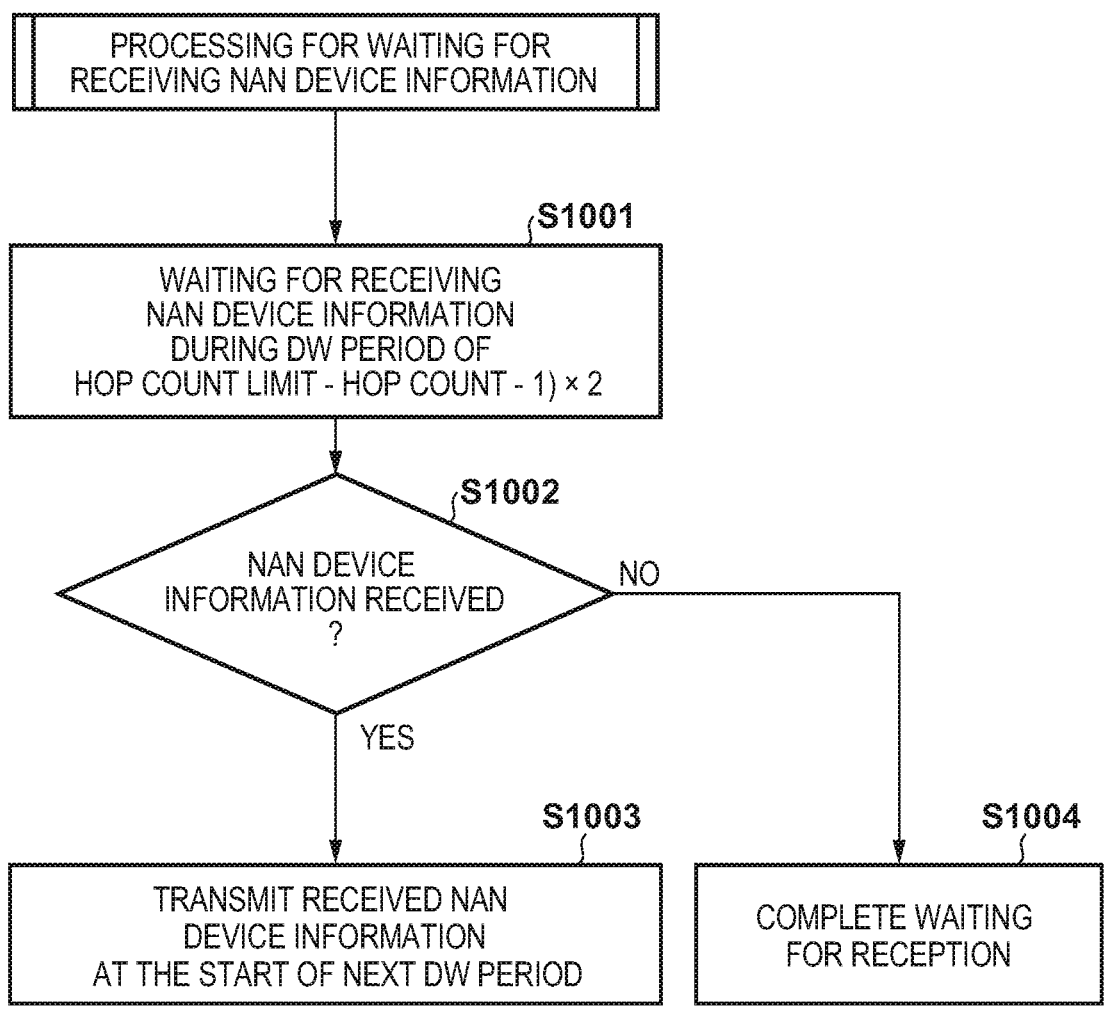

COMMUNICATION APPARATUS, CONTROL METHOD OF THE SAME, AND NON-TRANSITORY COMPUTER-READABLE STORAGE MEDIUM

CROSS-REFERENCE TO RELATED APPLICATIONS

This application is a Continuation of International Patent Application No. PCT/JP2016/083302, filed Nov. 10, 2016, which claims the benefit of Japanese Patent Application No. 2016-008290, filed Jan. 19, 2016, both of which are hereby incorporated by reference herein in their entirety.

BACKGROUND OF THE INVENTION

Field of the Invention

The present invention relates to a communication apparatus, a control method of the same, and a non-transitory computer-readable storage medium.

Background Art

Wireless local area network (LAN) systems represented by the IEEE802.11 are widely used. In a wireless LAN, the network is controlled by a base station called an access point (AP). The wireless network is constituted by this AP and a station (STA) that exists in a coverage of radio waves of the AP and is wirelessly connected to the AP. Recently, products and specification standards have been proposed that cover not only such simple conventional wireless network configurations constituted by an AP and a STA but also various wireless LAN network morphologies.

Neighbor Awareness Networking (NAN) has been defined by the Wi-Fi Alliance as a communication standard for discovering communication apparatuses or services provided by the communication apparatuses with reduced electric power. According to the NAN, periods in which communication apparatuses (hereinafter, referred to as "NAN devices") constituting the NAN exchange information are synchronized. This can shorten a period in which the wireless communication function of the NAN devices is enabled, and save electric power.

In the NAN, periodic time periods for synchronization are referred to as "Discovery Window (DW)". Furthermore, the network constituted by a group of NAN devices that share predetermined synchronization periods is referred to as a NAN cluster.

A NAN device can take one of the following roles within the NAN cluster: Master; Non-Master Sync; and Non-Master Non-Sync. The NAN device that can take the role of Master transmit, in a DW period, a Sync Beacon, which is a signal for enabling synchronization of NAN devices in the same NAN cluster. Once the synchronization has been established, the NAN devices within the NAN cluster transmit and receive a Subscribe message, which is a signal for searching for a service, and a Publish message, which is a signal for giving a notification indicating that the service is provided, to and from each other in a DW period. Furthermore, the NAN devices can transmit and receive a Follow-up message for exchanging additional information related to the service in a DW period. The frame structures of the messages such as Publish, Subscribe, and Follow-up messages are defined according to the NAN standard, and are referred to as Service Discovery Frames (SDFs). The SDFs include Service ID, which is an identifier for specifying a target service. As a result of NAN devices transmitting and receiving SDFs to and from each other, services can be discovered and detected.

CITATION LIST

Patent Literature

PTL1: US-2014-302787

As described above, NAN devices can discover and detect a service within a NAN cluster. However, a NAN device cannot acquire, form another device located within the NAN cluster but outside of the coverage of radio waves of that NAN device, NAN device information (for example, information (such as "Master Rank" or "Random Factor") that serves as a basis for deciding which one of the roles of Master, Non-Master Sync, and Non-Master Non-Sync a NAN device takes). Under such a situation, the NAN device cannot also recognize how many NAN devices exist for each role in the NAN cluster, and how many hopes forward in the cluster they exist.

The following method is conceivable as a method for a NAN device to acquire information relating to how many other NAN devices exist in the NAN cluster and which role they take. First, the NAN device broadcasts, to its neighbor, a message for requesting NAN device information. A NAN device that could receive it responds to the request. Furthermore, in order for the NAN device to acquire NAN device information from another NAN device outside of the coverage of radio waves of that NAN device, a first other NAN device that has received the request forwards the request to a second other NAN device (that is, the NAN device outside of the coverage of radio waves). Then, the second other NAN device that has received the forwarded message gives a response to the forwarded message with a message including its NAN device information, and the first other NAN device forwards the response to the original NAN device that desires to acquire information. By repeating such processing, the NAN device can acquire NAN device information of another NAN device that exists in the NAN cluster.

However, the above-described method has the following problem. That is, due to repetition of forwarding processing, the amounts of messages in the entire NAN cluster increase. According to the NAN standard, a period in which all NAN devices can perform reception is defined as "DW (Discovery Window) period", which is a time period of 16 TUs for every cycle of 512 TUs (1 TU=1024 μsec). Accordingly, if a NAN device transmits and receives many messages in this short time period of 16 TUs, the NAN device is unlikely to transmit a message for discovering and searching for a service. Therefore, such a problem may occur that a service cannot be discovered, or it takes a very long time until a service is discovered.

The present invention is made in view of the above-described problems, and it is an object thereof to provide a technique for reducing radio band occupancy when information relating to another communication apparatus that exists in a cluster is acquired.

SUMMARY OF THE INVENTION

According to one aspect of the present invention, there is provided a communication apparatus comprising: one or more processors; and one or more memories including instructions that, when executed by the processor (s), cause the apparatus to: receive a first acquisition request, which is a request for acquiring apparatus information relating to another communication apparatus that exists in a NAN (Neighbor Awareness Networking) cluster, from a first other communication apparatus; transmit, in a case where the first acquisition request signal is received, a second acquisition request signal that corresponds to the first acquisition request to the cluster; await reception of signals from a plurality of other communication apparatuses in response to the transmitted second acquisition request signal, for a predetermined period; and transmit pieces of apparatus information of the plurality of other communication apparatuses that are included in the signals received from the plurality of other communication apparatuses collectively to the first other communication apparatus.

Further features of the present invention will become apparent from the following description of exemplary embodiments with reference to the attached drawings.

BRIEF DESCRIPTION OF THE DRAWINGS

The accompanying drawings are included in the description, constitute part thereof, show embodiments of the present invention, and are used, together with the descriptions thereof, to explain the concept of the present invention.

FIG. 10 is a flowchart of reception waiting processing according to the second embodiment.

DESCRIPTION OF THE EMBODIMENTS

Hereinafter, the present invention will be described based on embodiments thereof with reference to the accompanying drawings. Note that the configurations shown in the following embodiments are merely examples, and the present invention is not limited to the shown configurations.

First Embodiment

Figure 1:
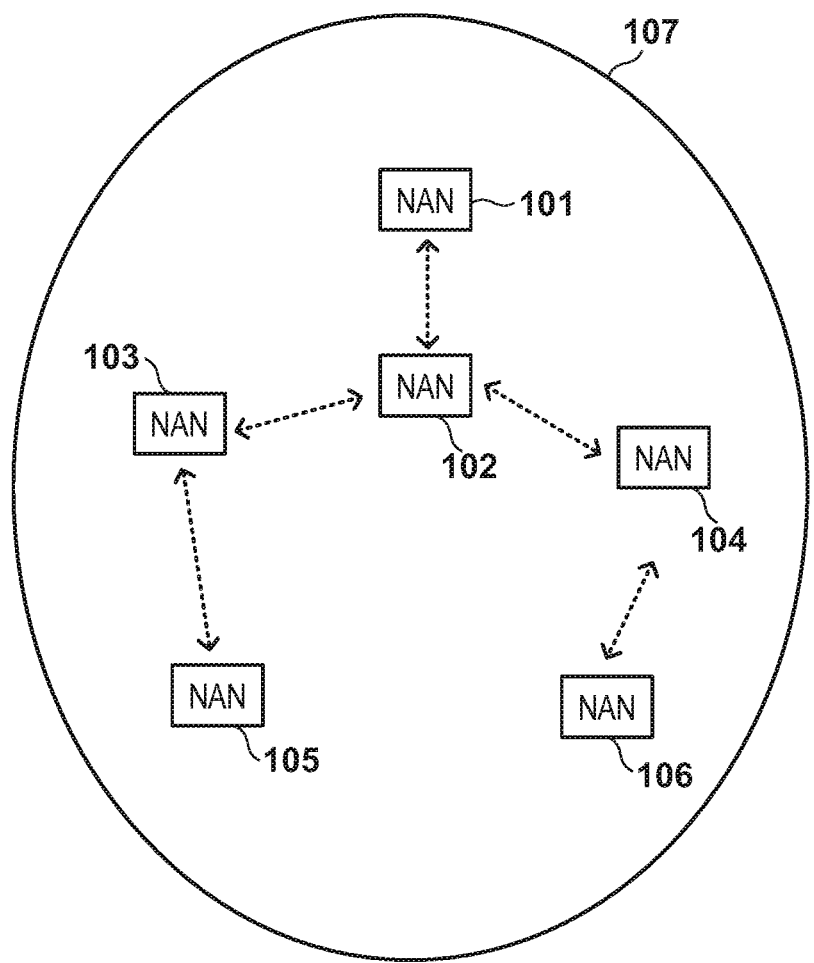
FIG. 1 is a diagram illustrating a configuration of a wireless network according to an embodiment.

FIG. 1 shows an exemplary network configuration according to the present embodiment. The following will describe an example in which a wireless LAN system conforming to the Neighbor Awareness Networking (NAN) standard is used.

A NAN device 102 is a wireless communication apparatus that is compliant with the NAN standard, and is capable of performing processing that will be described in detail later. Note that the NAN device 102 may be a device of any type as long as it can participate in the NAN and can communicate with another NAN device in a NAN cluster. NAN devices 101, and 103 to 106 are wireless communication apparatuses that are compliant with the NAN standard. Note that the NAN devices 101, and 103 to 106 also have the same configuration as the configuration of the NAN device 102, which will be described in detail later, and are capable of performing the same processing as that of the NAN device 102. The NAN devices 101 to 106 can discover and provide, based on the NAN standard, neighbor communication apparatuses or services provided by them. In FIG. 1, the NAN devices 101 to 106 participate in a NAN cluster 107. The NAN devices 101, 105, and 106 participate in the NAN cluster 107 as "Non-Master Non-Sync", and the NAN devices 102, 103, and 104 participate in the NAN cluster 107 as "Master". In the present embodiment, the NAN device 101 operates to acquire NAN device information of another NAN device participating in the NAN cluster 107.

It is assumed that only the NAN device 102 exists in the coverage of radio waves of the NAN device 101, and the NAN device 101 cannot communicate with the NAN devices 103 to 106 because they are geographically far from this NAN device. Similarly, it is assumed that only the NAN devices 101, 103, and 104 exist in the coverage of radio waves of the NAN device 102, and the NAN device 102 cannot communicate with the NAN devices 105 and 106. It is assumed that only the NAN devices 102 and 105 exist in the coverage of radio waves of the NAN device 103, and the NAN device 103 cannot communicate with the NAN devices 101, 104, and 106. It is assumed that only the NAN devices 102 and 106 exist in the coverage of radio waves of the NAN device 104, and the NAN device 104 cannot communicate with the NAN devices 101, 103, and 105. Furthermore, it is assumed that the NAN device 105 and the NAN device 106 are located at positions at which they cannot communicate with each other.

The NAN cluster 107 is a network in which the NAN devices 101 to 106 are participating. In the present embodiment, the NAN devices 101 to 106 participating in the NAN cluster 107 constitute a network using 6 ch. In the network of the NAN cluster 107, a Discovery Window (DW) is 16 Time Units (TUs), and there is an interval of 512 TUs between the start of the DW and the start of the next DW. Note that wireless channels and a DW configuration of the NAN are not limited to these. Each NAN device transmits and receives a frame to and from each other only during the DW period, and does not transmit and receive a frame during a period other than the DW period, thereby reducing a power consumption.

Figure 2:
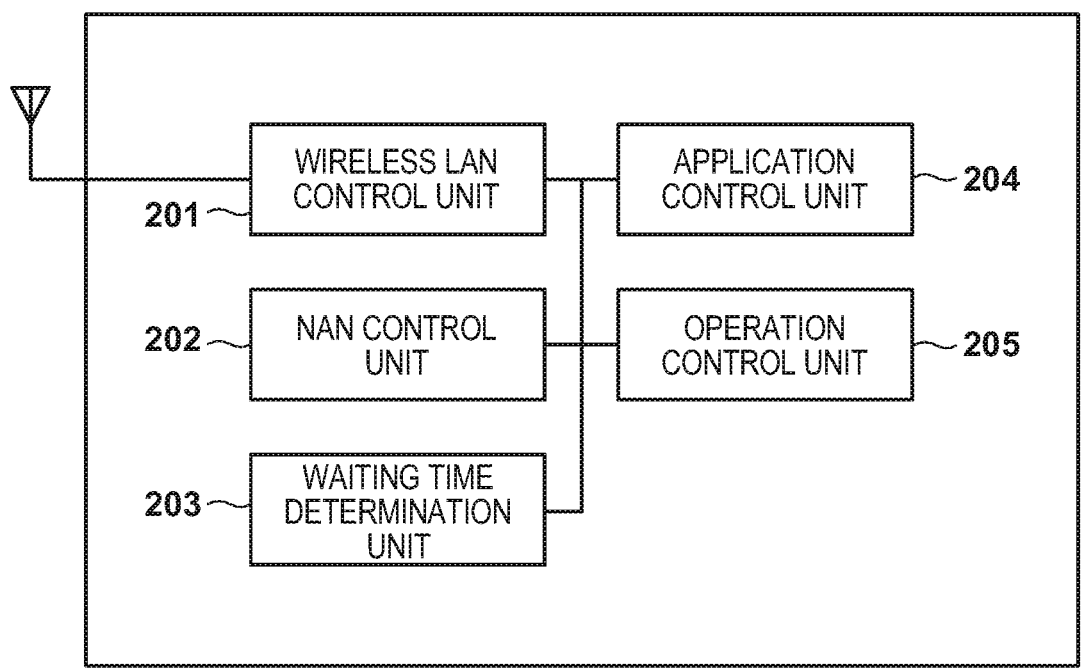
FIG. 2 is a diagram illustrating a functional configuration of a NAN device according to an embodiment.

FIG. 2 is a diagram illustrating a functional configuration of the NAN device 102. A wireless LAN control unit 201 performs control for transmitting and receiving a wireless signal to and from another wireless LAN device. Also, the wireless LAN control unit 201 performs wireless LAN control in compliance with IEEE802.11. A NAN control unit 202 performs control in compliance with the NAN standard. For example, once the synchronization with other NAN devices in the NAN cluster 107 has been established, the NAN control unit 202 transmits and receives the above-described SDF to discover and detect a service. A waiting time determination unit 203 controls the NAN control unit 202 to determine the waiting time for receiving a message that includes NAN device information transmitted from another NAN device. The details of the processing that is executed by the waiting time determination unit 203 will be described later with reference to FIGS. 4 and 5.

An application control unit 204 performs control for executing a discovered service. For example, if the NAN device 102 has discovered a printing service, then the application control unit 204 performs control for executing an application for requesting a print job. Alternatively, if the NAN device 102 has discovered a photo-sharing service, then the application control unit 204 performs control for executing an application for exchanging photographic data. The NAN device 102 may also include a plurality of application control units 204 to execute a plurality of services. An operation control unit 205 manages operations made on the NAN device 102 by a user via an input unit 304 (FIG. 3) and transfers required signals to the other control units 201 to 204.

Figure 3:
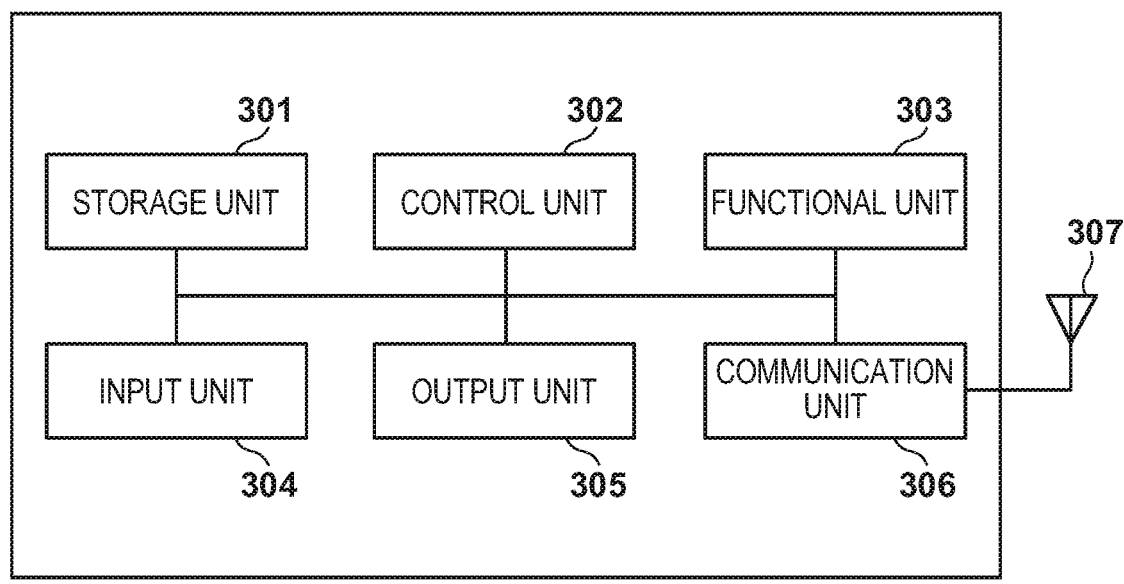
FIG. 3 is a diagram illustrating a hardware configuration of the NAN device according to an embodiment.

FIG. 3 shows a hardware configuration of the NAN device 102. A storage unit 301 is made of both or one of a ROM (Read Only Memory) and a RAM (Random Access Memory) and stores various types of programs for executing various operations that will be described later, and information such as communication parameters for wireless communication. Note that besides such memories as the ROM, the RAM and the like, a storage medium such as a flexible disk, a hard disk, an optical disk, a magnetic optical disc, a CD-ROM, a CD-R, an electromagnetic tape, a nonvolatile memory card, or a DVD may be used as the storage unit 301.

A control unit 302 is constituted by a CPU (Central Processing Unit) or an MPU (Micro Processing Unit), and controls the entire NAN device 101 by executing a program stored in the storage unit 301. Note that the control unit 302 may also control the entire NAN device 101 in cooperation with a program stored in the storage unit 301 and an OS (Operating System). Furthermore, the control unit 302 controls a functional unit 303 to execute predetermined processing such as image capture, printing, or projection.

The functional unit 303 is a piece of hardware for causing the NAN device 101 to execute predetermined processing. For example, if the NAN device 101 is a camera, the functional unit 303 is an image capturing unit, and performs image capturing processing. Furthermore, for example, if the NAN device 101 is a printer, the functional unit 303 is a printing unit, and performs printing processing. Furthermore, for example, if the NAN device 101 is a projector, the functional unit 303 is a projection unit, and performs projection processing. Data that is processed by the functional unit 303 may be data stored in the storage unit 301, or data communicated with another NAN device via a later-described communication unit 306.

The input unit 304 accepts various types of operations from the user. An output unit 305 performs various types of output for the user. Here, output by the output unit 305 includes at least one of on-screen display, audio output using a speaker, vibration output, and the like. Note that both the input unit 304 and the output unit 305 may also be realized by a single module such as a touch panel.

The communication unit 306 controls wireless communication conforming to the IEEE802.11 series, and controls IP (Internet Protocol) communication. Furthermore, the communication unit 306 controls an antenna 307 to transmit and receive a wireless signal for wireless communication. The NAN device 101 communicates content such as image data, document data, and video data with another NAN device via the communication unit 306.

Figure 4:
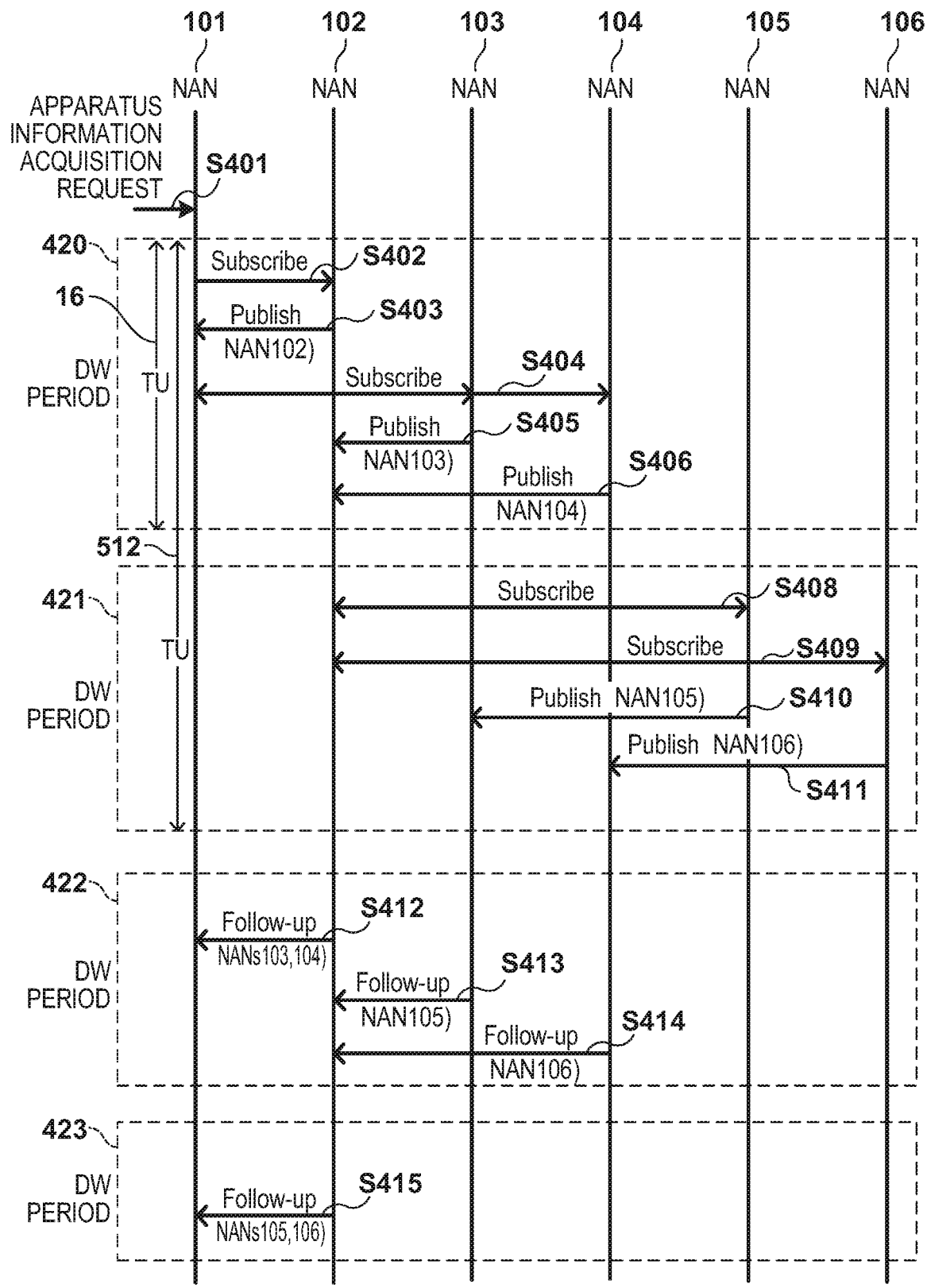
FIG. 4 is a diagram illustrating a sequence according to a first embodiment.

The following will describe, with reference to a sequence diagram of FIG. 4, an exemplary flow of a series of processes performed when the NAN device 101 acquires NAN device information of the NAN devices 102 to 106 within the NAN cluster 107, according to the present embodiment. Note that numbers in parentheses denote the NAN device information of corresponding one of the NAN devices 102 to 106.

In the present example, it is assumed that the NAN device 101 broadcasts a request (extended Subscribe message, details of which will be described later with reference to FIG. 6) for acquiring NAN device information (apparatus information) within the NAN cluster 107 in accordance with a user operation. The NAN device 102 that has received this request responds to the request, and forwards the request by broadcasting it. Accordingly, NAN devices outside of the coverage of radio waves of the NAN device 101 can receive that request.

Note that in the present embodiment, it is assumed that the NAN devices that take the roles of Master and Non-Master Sync can forward a request of a NAN device. This is because the NAN devices taking these roles transmit a Sync Beacon on a regular basis, and the NAN device that takes the role of Non-Master Non-Sync can participate in the NAN cluster if it can receive the Sync Beacon. In other words, as a result of the NAN devices that take the role of Non-Master Non-Sync not performing forwarding processing, it is possible to prevent unnecessary band occupancy. In the present embodiment, as shown in FIG. 1, in the NAN cluster 107, the NAN devices 102, 103, and 104 take the role of Master, and the NAN devices 101, 105, and 106 take the role of Non-Master Non-Sync. Accordingly, the NAN devices 102, 103, and 104 can forward a request from a NAN device.

In step S401, first, a user of the NAN device 101 starts processing for acquiring NAN device information of a NAN device within the NAN cluster 107 via the input unit 304 of the NAN device 101. Even after having started the processing for acquiring NAN device information, the NAN device 101 does not transmit a Subscribe message for requesting NAN device information acquisition until a DW period.

In a DW period 420, the NAN device 101 transmits a Subscribe message by broadcasting it (step S402). In DW periods, the NAN devices 102, 103, and 104 taking the role of Master transmit a Sync Beacon, but here description of transmission of a Sync Beacon is omitted. A Subscribe message of the present embodiment is an extended Subscribe message for requesting NAN device information that is obtained by extending a Subscribe message defined according to the NAN standard.

Figure 6:
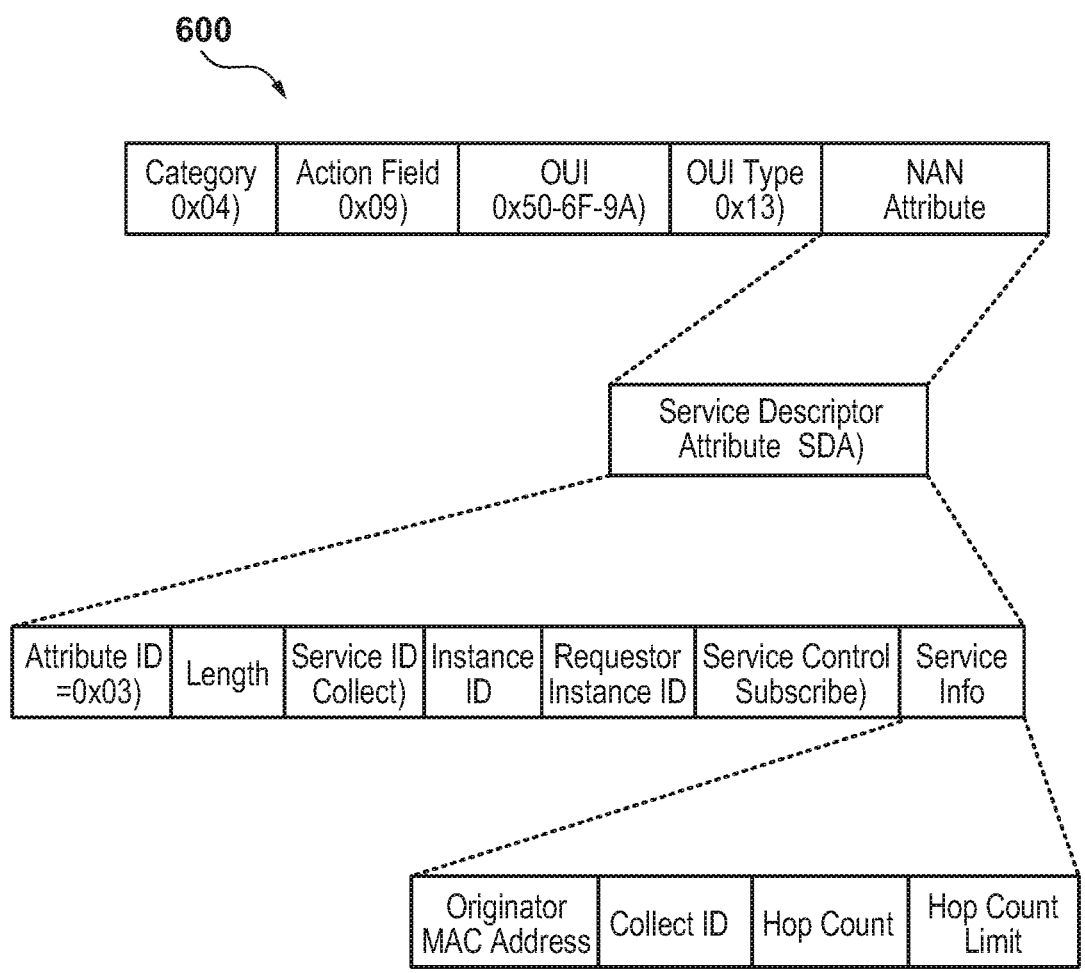
FIG. 6 is a diagram illustrating a configuration of an extended Subscribe message of an embodiment.

FIG. 6 shows an extended Subscribe message configuration 600 according to the present embodiment. The message configuration 600 of FIG. 6 is obtained by extending a Publish message defined according to the NAN standard, and in "Service ID", a value representing "Collect", which indicates that it is a Subscribe message relating to a service of requesting (that is, collecting) NAN device information, is stored. Furthermore, in "Service Info", various types of information for requesting NAN device information are stored. In "Originator MAC Address", a MAC address of an originator that has requested NAN device information is stored. That is, in step S402 (and the subsequent steps S404, S408, and S409), the MAC address of the NAN device 101 is stored in "Originator MAC Address".

To "Collect ID" that follows "Originator MAC Address", when apparatus information has been requested multiple times, IDs for identifying the respective apparatus information requests are assigned. For example, when the NAN device 101 has requested NAN device information multiple times, different values are assigned to "Collect ID" of the respective extended Subscribe messages. Accordingly, the NAN device that has received an extended Subscribe message can detect whether or not the received extended Subscribe message is redundant. If the extended Subscribe message of the same Collect ID is detected as having been received, the NAN device that has received the extended Subscribe message recognizes that the received extended Subscribe message is redundant and does not respond and forward it. On the other hand, if having been received an extended Subscribe message with a Collect ID that has not been received before, the NAN device forward the extended Subscribe message without changing the value of the Collect ID.

In "Hop Count" that follows "Collect ID", the value indicating the number of times that the extended Subscribe message has been forwarded before is stored. Accordingly, 0 is stored in "Hop Count" of the extended Subscribe message transmitted by the NAN device 101. Also, the NAN device 102 that has received the extended Subscribe message from the NAN device 101 sets the value of "Hop Count" to 1 and forwards the extended Subscribe message.

To "Hop Count Limit" that follows "Hop Count", the number of times that the extended Subscribe message is allowed to be forwarded is assigned. For example, if an extended Subscribe message in which 0 is assigned to its Hop Count Limit is transmitted by the NAN device 101, the NAN device 102 that has received it is not allowed to forward the extended Subscribe message. Furthermore, if an extended Subscribe message in which 1 is assigned to its Hop Count Limit is transmitted by the NAN device 101, the NAN device 102 that has received it assigns 1 to "Hop Count" and forwards it. Then, the NAN device that has received the forwarded extended Subscribe message is not allowed to extend and forward the Subscribe message, since "Hop Count Limit" has reached its upper limit.

By performing assignment to "Hop Count" and "Hop Count Limit" in this way, the NAN device 101 can assign the range in which an extended Subscribe message can be transmitted. In other words, the NAN device 101 can assign the number of hops of NAN devices for NAN device information acquisition targets within the NAN cluster 107.

The description will return to FIG. 4. In the extended Subscribe message in step S402, it is assumed that 0 is stored in its Hop Count, 2 is stored in its Hop Count Limit. It is also assumed that a unique value that has not assigned before is assigned to its Collect ID. The extended Subscribe message transmitted from the NAN device 101 is received by the NAN device 102 located in the coverage of radio waves of the NAN device 101.

Upon receiving the extended Subscribe message, the NAN device 102 responds, in step S403, with an extended Publish message in which the NAN device information of the NAN device 102 is stored. The extended Publish message according to the present embodiment is an extended Publish message obtained by extending a Publish message defined according to the NAN standard.

Figure 7:
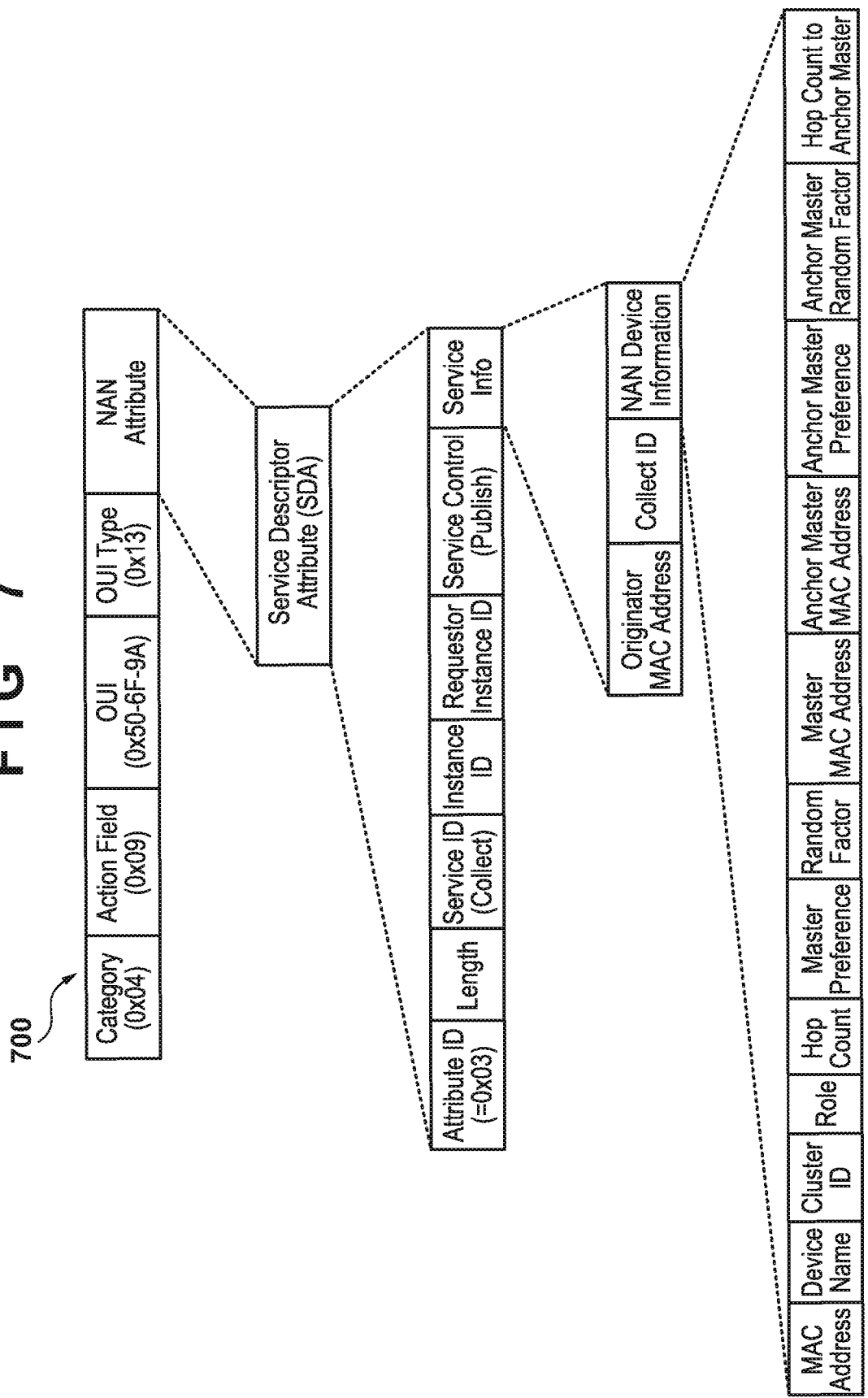
FIG. 7 is a diagram illustrating a configuration of extended Publish message of an embodiment.

FIG. 7 shows an extend Publish message configuration 700 according to the present embodiment. The message configuration 700 of FIG. 7 is obtained by extending a Publish message defined according to the NAN standard, and in "Service ID", a value representing "Collect", which indicates that it is a Publish message relating to a service of requesting (that is, collecting) NAN device information, is stored. Furthermore, in "Service Info", various types of information for responding with NAN device information are stored. In "Originator MAC Address", a MAC address of an originator that has requested NAN device information is stored. That is, in the present embodiment, the MAC address of the NAN device 101 is stored in "Originator MAC Address". To "Collect ID", the Collect ID included in the received extended Subscribe message is assigned. Accordingly, the NAN device that has received the forwarded extended Publish message can identify the NAN device information request to which the response is made.

In "NAN device information" that follows "Collect ID", various types of information relating to the NAN device are stored. The first piece of information included in "NAN device information" is a MAC address for identifying the NAN device to which the NAN device information relates. In step S403, the MAC address of the NAN device 102 is stored in "NAN device information". In "Device Name" that follows "MAC address", a character string is stored for identifying which NAN device it is. In step S403, the character string "NAN Device 102" is stored.

To "Cluster ID" that follows "Device Name", a Cluster ID that is defined according to the NAN standard is assigned to identify the cluster to which the device belongs. In the present embodiment, the Cluster ID that corresponds to the NAN cluster 107 is assigned. In "Role", a role of the NAN device is stored. That is, information for identifying which role of Master, Non-Master Sync, or Non-Master Non-Sync the device participating in the NAN cluster takes is stored in "Role". In "Hop Count", the value indicating how many hops the NAN device is away from the originator NAN device is stored. In step S403, the response is made by the NAN device 102, which is not hopped from the originator NAN device 101 that has requested the NAN device information, and thus 0 is stored in "Hop Count". That is, the NAN device 102 sets the Hop Count assigned in the received extended Subscribe message in the extended Publish message and responds with it. "Master Preference" and "Random Factor" that follow "Hop Count" include information that indicates the likelihood that the device takes the role of Master or Non-Master Sync defined according to the NAN standard. A NAN device that has received an extended Publish message including this information can recognize the likelihood that the NAN device from which the message has been transmitted takes the role of Master.

To "Master MAC Address" and "Anchor Master MAC Address", MAC addresses of a Master NAN device and an Anchor Master NAN device that have transmitted a Sync Beacon for synchronization of the NAN devices within the NAN cluster are assigned. Note that "Anchor Master" is a NAN device that serves as a basis for determining the time reference within the NAN cluster. The MAC address of the NAN device 102 is stored in "Master MAC Address" and "Anchor Master MAC Address" since, in step S403, the NAN device 102 takes the role of Master and the role of Anchor Master.

"Anchor Master Preference" and "Anchor Master Random Factor" that follow "Anchor Master MAC Address" include information indicating the likelihood that the NAN device taking the role of Anchor Master transits to the NAN device taking the role of Master or the role of Non-Master Sync. A NAN device that has received an extended Publish message including this information can recognize whether or not the NAN device taking the role of Anchor Master can stably continue to be an Anchor Master within the NAN cluster, that is, whether or not the NAN cluster is stable. In "Hop Count to Anchor Master" that follows them, the number of hops from the NAN device to the NAN device taking the role of Anchor Master is stored. An extended Publish message is a message to be returned as a response to the NAN device that has transmitted an inquiry or the NAN device that has forwarded the inquiry, and thus is transmitted through unicast.

The description will return to FIG. 4. Since the extended Subscribe message received in step S402 has Hop Count=0 and Hop Count Limit=2, the NAN device 102 forwards the extended Subscribe message to further acquire information also from another NAN device (step S404). At this time, the same values as in step S402 are assigned to "Originator MAC Address", "Collect ID", and "Hop Count Limit" of the extended Subscribe message. On the other hand, the Hop Count is incremented to 1 because the Subscribe message in step S404 is a forwarded message of the Subscribe message of step S402.

In step S404, the NAN device 101 that has received the Subscribe message can determine that the Subscribe message is a forwarded message of the extended Subscribe message transmitted by the NAN device 101 itself in step S402, based on the Originator MAC Address and the Collect ID, and thus the NAN device 101 does not respond to the reception. On the other hand, the NAN devices 103 and 104 each transmit an extended Publish message as a response (steps S405 and S406), because they have received the extended Subscribe message that includes a Collect ID that has not received before. At this time, the NAN device information of the NAN device 103 is stored in the extended Publish message that is transmitted in step S405, and the NAN device information of the NAN device 104 is stored in the extended Publish message that is transmitted in step S406. Furthermore, 1 is assigned to "Hop Count" as in the Subscribe message of step S404. Accordingly, the NAN device 101 can recognize that the NAN devices 103 and 104 are NAN devices that are located at one hop forward from the NAN device 101 via the NAN device 102.

The NAN device 102 that has forwarded the extended Subscribe message in step S404 notifies, upon receiving an extended Publish message in which NAN device information of another NAN device is stored, the NAN device 101 of the NAN device information. However, the band usage is inefficient if only one piece of NAN device information is transmitted for each message. Accordingly, the NAN device 102 does not immediately transmit the information of the NAN device 103 that was received in step S405 to the NAN device 101, and waits for possible reception of messages including NAN device information from a larger number of NAN devices, in accordance with the flowchart shown in FIG. 5. Then, the NAN device 102 transmits the NAN device information of the NAN device 103 that was received in step S405 to the NAN device 101.

Figure 5:
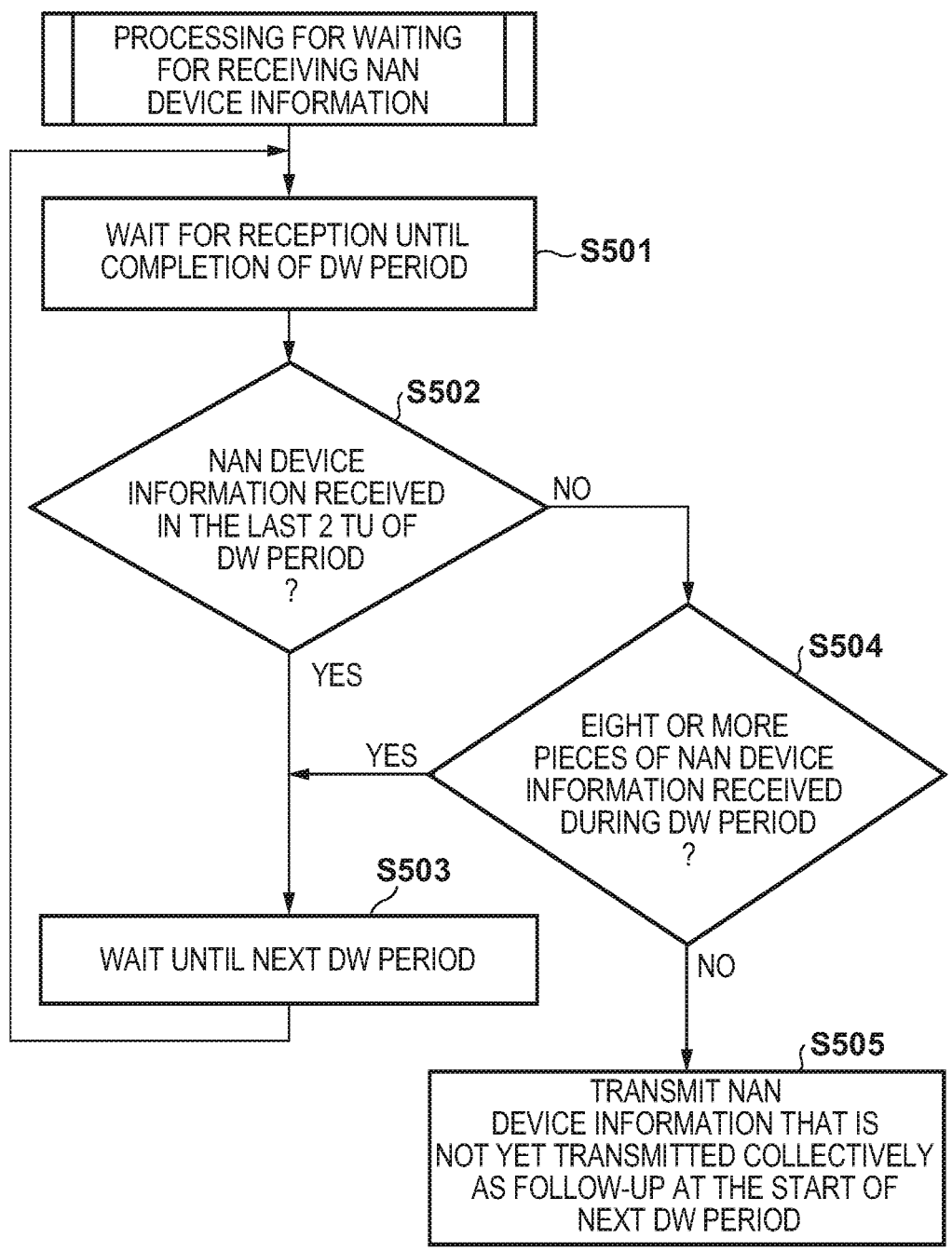
FIG. 5 is a flowchart of reception waiting processing according to the first embodiment.

FIG. 5 shows a flowchart of processing in which, when having received an extended Publish message or a later-described extended Follow-up message, the NAN device 102 waits for receiving another message, and transmits NAN device information included in the received message as an extended Follow-up message. Note that the present processing may also be performed by another NAN device existing in the NAN cluster 107.

When having received an extended Publish message, the NAN device 102 does not transmit the extended Follow-up message during the DW period in which this extended Publish message has been received. Then, the NAN device 102 waits for receiving an extended Publish message or an extended Follow-up message from another NAN device until the DW period is complete (step S501).

After the DW period is complete, the NAN device 102 determines whether or not an extended Publish message or an extended Follow-up message has been received during the latter half TU of the DW period, namely, the last period of 2 TUs in the present embodiment (step S502). If an extended Publish message or an extended Follow-up message has been received during the last period of 2 TUs (Yes in step S502), the NAN device 102 waits until the next DW period (step S503). If these messages have been received during the last period of 2 TU, there is the possibility that time could not secured sufficient for another NAN device to transmit an extended Publish message or an extended Follow-up message and the message has not been transmitted. Accordingly, the NAN device 102 waits until the next DW period since the NAN device 102 may further receive an extended Publish message or an extended Follow-up message from another NAN device in the next DW period (step S503). Then, in the next DW period, the NAN device 102 again waits for receiving an extended Publish message or an extended Follow-up message until the DW period is complete (step S501).

If no extended Publish message or extended Follow-up message has been received in the last period of 2 TU of the DW period (No in step S502), the procedure advances to step S504. In step S504, the NAN device 102 determines whether or not extended Publish messages or extended Follow-up messages have been received from at least eight NAN devices in this DW period. This is because, if the NAN device 102 receives many pieces of NAN device information, there is the possibility that many NAN devices exist in the NAN cluster and the wireless band is congested, and thus there may be a NAN device that could not transmit any extended Publish message or extended Follow-up message in the DW period. Accordingly, if at least eight extended Publish messages or extended Follow-up messages have been received (Yes, in step S504), the NAN device 102 waits for an extended Publish or extended Follow-up message also in the next DW period, as in the case of "Yes" in step S502 (step S503).

If at least eight extended Publish messages or extended Follow-up messages have not been received in step S504 (No in step S504), the procedure advances to step S505. In step S505, the NAN device 102 determines that it has sufficiently waited for receiving an extended Publish message or extended Follow-up message, and decides to transmit NAN device information that has not yet been transmitted at a time as an extended Follow-up message at the start of the next DW period (step S505).

With this flowchart, even if having received NAN device information from a single NAN device, the NAN device 102 does not immediately return the information to the NAN device 101. The NAN device 102 can determine the waiting time depending on the timing at which the NAN device information was received and the number of times when the NAN device information was received. Accordingly, it is possible to mitigate the band occupancy that may be caused due to a plurality of NAN devices in the NAN cluster 107 transmitting NAN device information. Note that although, in step S501, the NAN device 102 waits for reception during one DW period, the present invention is not limited to one DW period, and the NAN device 102 may wait for reception during two or more DW periods. Furthermore, in FIG. 5, although, in step S502, it is determined whether or not apparatus information has been received during the last 2 TU of the DW period, the TU count is not limited to 2. Furthermore, although, in step S504, it is determined whether or not at least eight pieces of NAN device information have been received during the DW period, the number of pieces of NAN device information is not limited to 8.

The description will return to FIG. 4. Here, the following description will be given assuming that the NAN device 102 receives, in the last 1 TU of the DW period 420, the extended Publish message transmitted from the NAN device 104 in step S406. Since the situation corresponds to "Yes" in step S502, the NAN device 102 continues to wait for an extended Publish message or extended Follow-up message also in a DW period 421, which is the next DW period. Accordingly, the NAN device 102 does not transmit the NAN device information of the NAN device 103 and the NAN device 104 to the NAN device 101. The following description will be given further assuming that because the NAN device 103 and the NAN device 104 take the role of Master, they need to forward the extended Subscribe message received in step S404 but could not forward it in the DW period 420, since the DW period 420 is complete.

In DW period 421, in the DW period 420, the NAN device 103 and the NAN device 104 each transmit an extended Subscribe message (steps S408 and S409). In the extended Subscribe messages that are transmitted in steps S408 and S409, the same values are assigned to "Originator MAC Address", "Collect ID", and "Hop Count Limit" as those included in the extended Subscribe messages transmitted in steps S402 and S404. On the other hand, "Hop Count" is incremented to 2, since the extended Subscribe messages that are transmitted in steps S408 and 409 are forwarded messages of the extended Subscribe message transmitted in step S404. Here, "Hop Count=Hop Count Limit=2", and thus the NAN device (that is, the NAN device 102) that has received the extended Subscribe message transmitted in steps S408 and S409 and takes the role of Master does not forward this extended Subscribe message.

Upon receiving the extended Subscribe messages transmitted in steps S408 and S409, the NAN device 102 determines, based on the Originator MAC Address and the Collect ID, that the messages are forwarded messages of the extended Subscribe message transmitted by the NAN device 102 in step S404. Accordingly, the NAN device 102 does not respond to the received extended Subscribe messages. That is, the NAN device 102 does not transmit any extended Publish message.

On the other hand, the NAN device 105 transmits, upon receiving the extended Subscribe message from the NAN device 103, an extended Publish message including its own NAN device information as a response (step S410). Similarly, the NAN device 106 transmits, upon receiving the extended Subscribe from the NAN device 104, an extended Publish message including its own NAN device information as a response (step S411). In "NAN device information" included in the extended Publish messages transmitted in steps S410 and S411, the NAN device information of the NAN device 105 and the NAN device 106 are respectively included. Furthermore, 2 is assigned to "Hop Count", that is, the same value as that assigned to "Hop Count" of the extended Subscribe messages transmitted in steps S408 and S409. Accordingly, the number of hops from the NAN device 101 is stored.

It is assumed that the transmission of the extended Publish messages in steps S410 and S411 is performed in the first 5 TUs of the DW period 421. Accordingly, the NAN device 103 and the NAN device 104 respectively decide to transmit the NAN device information received in steps S410 and S411 as extended Follow-up messages to the NAN device 102 in the next DW period, that is, a DW period 422, in accordance with the flowchart of FIG. 5 (No in step S502, and No in step S504).

Similarly, the NAN device 102 does not receive NAN device information in the DW period 421. Accordingly, the NAN device 102 decides to transmit the NAN device information received in steps S405 and S406 as an extended Follow-up message to the NAN device 101 in the next DW period, that is, the DW period 422, in accordance with the flowchart of FIG. 5 (No in step S502, and No in step S504).

Figure 8:
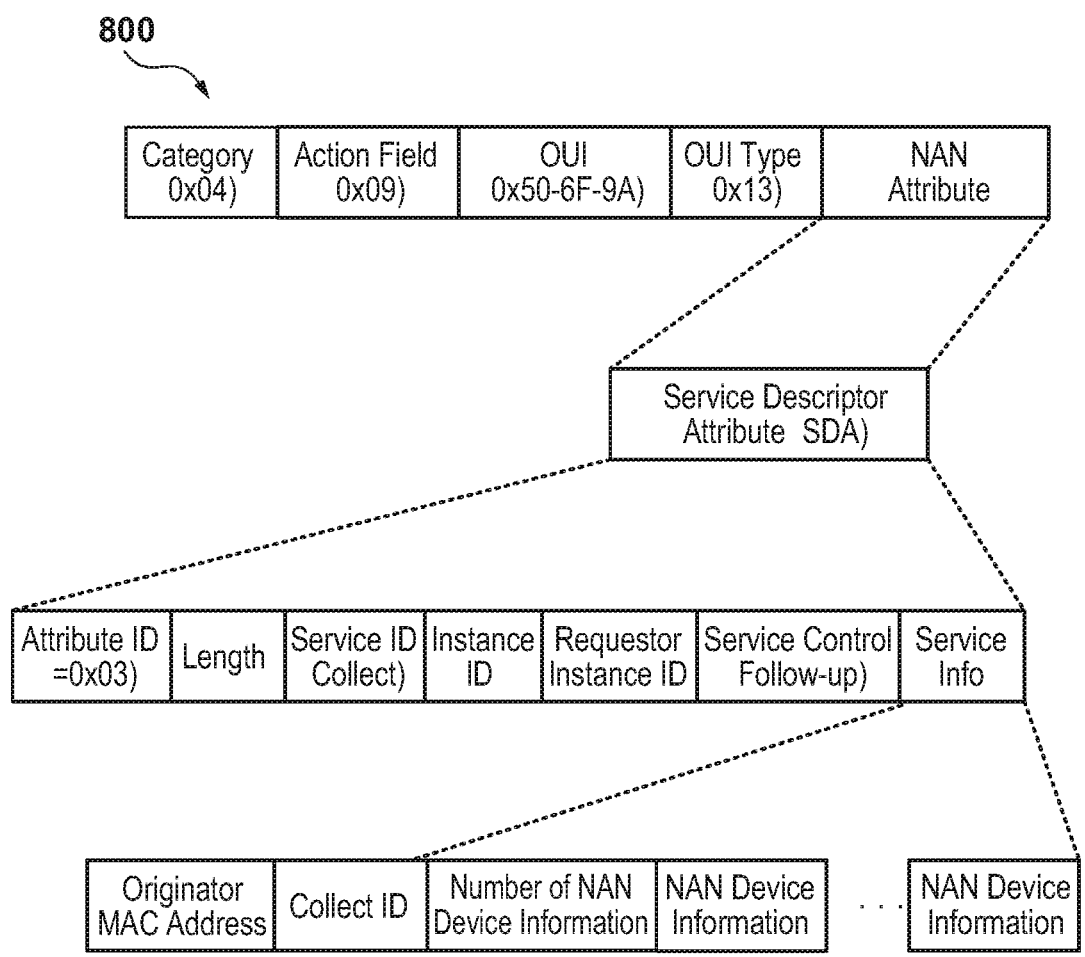
FIG. 8 is a diagram illustrating a configuration of an extended Follow-up message of an embodiment.

In the DW period 422, the NAN device 102 transmits, to the NAN device 101, the NAN device information of the NAN device 103 and the NAN device 104 as the extended Follow-up messages (step S412). The frame structure of an extended Follow-up message is shown in FIG. 8. Also, similarly, the NAN device 103 transmits the information of the NAN device 105 with an extended Follow-up message, and the NAN device 104 transmits the information of the NAN device 106 with an extended Follow-up message (steps S413 and S414).

FIG. 8 shows an extended Follow-up message configuration 800 according to the present embodiment for transmitting information of another NAN device received with an extended Publish message to the originator. In the present embodiment, an extended Follow-up message is transmitted by the NAN devices 102, 103, and 104 that have received the extended Publish message. The message configuration 800 of FIG. 8 is obtained by extending a Follow-up message defined according to the NAN standard, and in "Service ID", a value representing "Collect", which indicates that it is a Follow-up relating to a service of requesting (that is, collecting) NAN device information, is stored. Furthermore, in "Service Info", various types of information for transferring another piece of NAN device information is stored. In "Originator MAC Address", a MAC address of an originator that has requested NAN device information is stored. That is, in the present embodiment, the MAC address of the NAN device 101 is assigned to "Originator MAC Address". To "Collect ID", the Collect ID included in a received extended Publish message is assigned. Accordingly, the NAN device that has received the extended Follow-up can identify to which NAN device information request the response is.

In "Number of NAN device information" that follows "Collect ID", a value indicating the number of other NAN devices included in this extended Follow-up message is stored. 2 is stored in "Number of NAN device information" of the extended Follow-up message transmitted in step S412 since the pieces of NAN device information of the NAN device 103 and the NAN device 104 are stored therein. On the other hand, 1 is stored in "Number of NAN device information" of the extended Follow-up message transmitted in step S413 since the NAN device information of the NAN device 105 is stored therein. Similarly, 1 is stored in "Number of NAN device information" of the extended Follow-up message that is transmitted in step S414 since the NAN device information of the NAN device 106 is stored therein.

In "NAN device information" that follows "Number of NAN device information", various types of NAN device information are stored. Various types of values in "NAN device information" are the same as those in the extended Publish message described with reference to FIG. 7, and thus descriptions thereof are omitted. Note however that, unlike "NAN device information" in the extended Publish message, "NAN device information" in the Follow-up message can include pieces of NAN device information of a plurality of other NAN devices. The number thereof is the same as the value assigned to "Number of NAN device information". The value of "NAN device information" in the extended Follow-up message that is transmitted in step S412 is 2, and is the same as the value of "NAN device information" in the extended Publish messages respectively received in steps S405 and S406. The value of "NAN device information" in the extended Follow-up message respectively transmitted in steps S413 and S414 is 1, and is the same as the value of "NAN device information" in the extended Publish message respectively received in steps S410 and S411.

The description will return to FIG. 4. Upon receiving the extended Follow-up messages in steps S413 and S414, the NAN device 102 determines a timing of transmitting NAN device information again in accordance with the flowchart of FIG. 5. Here, the following description will be given assuming that the NAN device 102 has received the extended Follow-up messages transmitted in steps S413 and S414 in the first 5 TUs of the DW period 422. At this time, the NAN device 102 devices to transmit the pieces of NAN device information of the NAN devices 105 and 106 as an extended Follow-up message in the next DW period in accordance with the flowchart of FIG. 5 (No in step S502, and No in step S504).

Then, in a DW period 423, the NAN device 102 transmits the extended Follow-up message in "NAN device information" of which the pieces of NAN device information of the NAN device 105 and the NAN device 106 to the NAN device 101 (step S415). With the above-described measure, the NAN device 101 can collect information relating to another NAN device that is participating in the NAN cluster 107.

In the present embodiment, instead of immediately forwarding a message including NAN device information received in steps S405, S406, S413, and S414, the NAN device 102 transmits a plurality of pieces of NAN device information collectively at a time as in the processing in steps S412 and S415. This reduces the radio band occupancy. Furthermore, in the present embodiment, a timing at which NAN device information of another NAN device is transmitted is determined depending on an extended Publish message or extended Follow-up message is received. Therefore, it is possible to flexibly make a response depending on the number of neighbor NAN devices or the wireless band. Note that, in the present embodiment, the pieces of NAN device information of all the NAN devices existing in the NAN cluster 0107 are not transmitted collectively but are transmitted three times in a divided manner in steps S403, S412, and S415. In other words, transmission of NAN device information to the NAN device 101 is performed a plurality of times and thus the wireless band is occupied, but it is advantageous that the NAN device 101 can rapidly know midway information.

Second Embodiment

The embodiment differs from the first embodiment in that the waiting time for receiving NAN device information is determined based on "Hop Count" and "Hop Count Limit". The descriptions on the same features as in the first embodiment are omitted. In the present embodiment, processing performed by the waiting time determination unit 203 is different from that of the first embodiment. FIG. 10 shows processing for deciding the waiting time for receiving NAN device information according to the present embodiment.

FIG. 10 shows a flowchart of the processing for determining the waiting time for receiving NAN device information that is performed by the NAN device 102 according to the present embodiment. The present processing can be executed by the NAN device that has received an extended Subscribe message. Note that the present processing may also be executed by another NAN device existing in the NAN cluster 107.

Upon receiving an extended Subscribe message, the NAN device 102 first calculates (Hop Count Limit–Hop Count–1)×2=N, based on "Hop Count Limit" (that is, frequency information relating to the number of times that requests for requesting NAN device information can be transmitted (relayed)) and "Hop Count" included in the received extended Subscribe message. The NAN device 102 waits for an extended Publish message and an extended Follow-up message from another NAN device only during N-fold DW period, where N is the result of the calculation (step S1001).

The processing in step S1001 will be described. By calculating (Hop Count Limit–Hop Count), it is possible to obtain the residual number of hops for which the messages need to be transferred (the number of NAN devices via which the messages can be relayed). Here, a case is considered in which the next DW period is needed for the extended Subscribe message transmitted in a DW period 920 to be forwarded, and yet another DW period is needed for a response to this extended Subscribe message to be received. In this case, the number of DW period needed for the reception is determined, by doubling the residual number of hops, which is obtained by (Hop Count Limit–Hop Count–1), taking into consideration the DW periods for the forwarding of the extended Subscribe message and the reception of the response thereto. In a case where the values of "Hop Count Limit" and "Hop Count" are identical, both values have a negative value, but in this case, forwarding processing will not be executed anyway.

The NAN device 102 waits for receiving NAN device information in accordance with the processing in step S1001, and determines whether or not NAN device information of another NAN device (at least one of the NAN devices 103 to 106) could be received (step S1002). If NAN device information of another NAN device could be received (Yes in step S1002), the NAN device 102 transmits an extended Follow-up message with the NAN device information of the other NAN device information included (step S1003). On the other hand, if NAN device information of another NAN device could not be received (No in step S1002), the NAN device 102 ends the waiting for receiving the NAN device information of another NAN device, and does not transmit the extended Follow-up message (step S1004).

Figure 9:
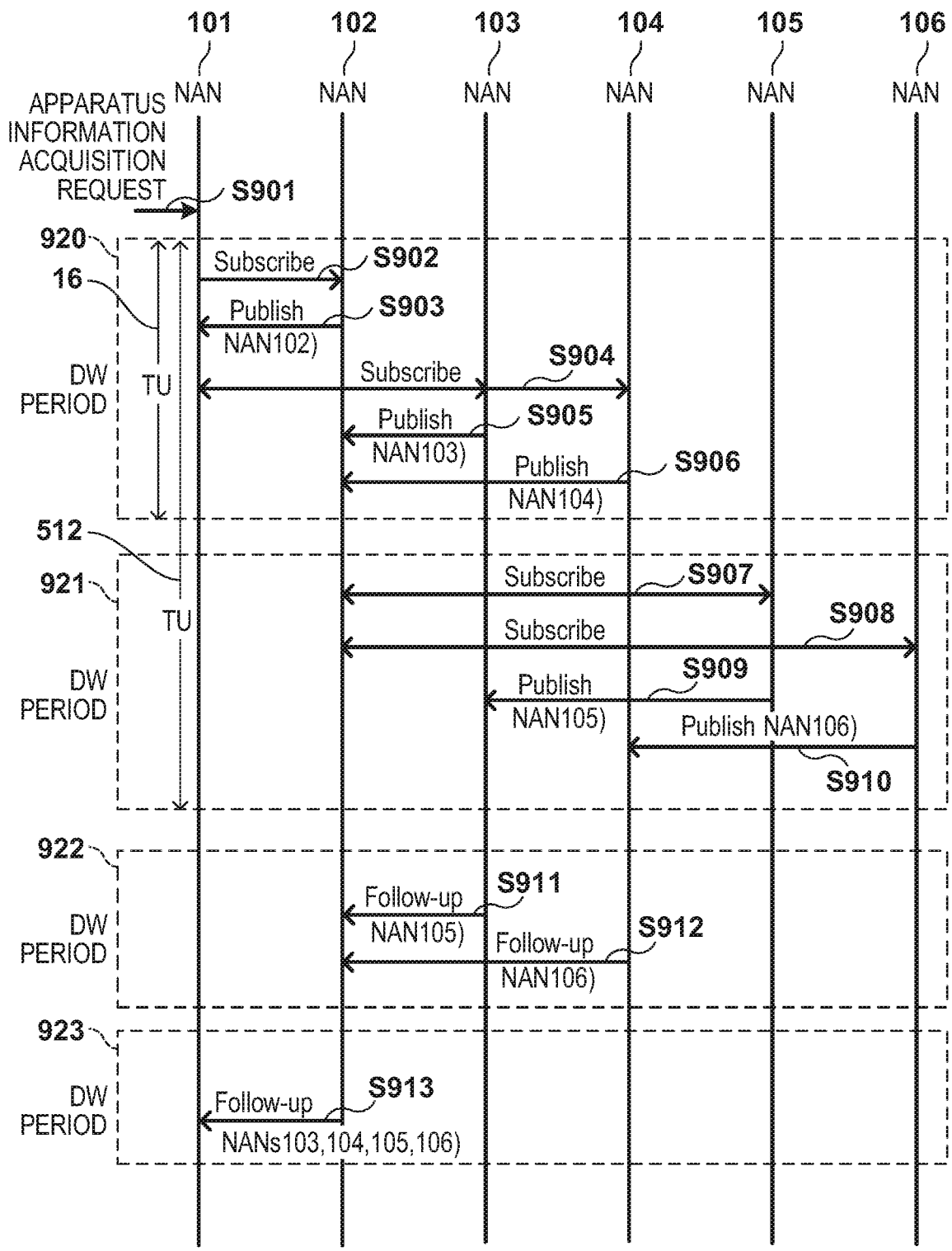
FIG. 9 is a diagram illustrating a sequence according to a second embodiment.

FIG. 9 shows a sequence diagram of an example of the flow of a series of processing performed when the NAN device 101 acquires the NAN device information of the NAN devices 102 to 106 in the NAN cluster 107, in the present embodiment. Detailed descriptions of the same features as those of FIG. 4 are omitted.

The procedure from steps S901 to S903 is the same as in FIG. 4, and thus detailed description thereof is omitted. Note however that the NAN device 102 executes, upon receiving an extended Subscribe message in step S902, the flowchart of FIG. 10, and determines a waiting time for acquiring NAN device information. Here, the following description will be given assuming that the extended Subscribe message received in step S902 has Hop Count=0 and Hop Count Limit=2, as in the first embodiment. In this case, in step S1002, (Hop Count Limit–Hop Count–1)×2=2, and thus, during two DW periods, the NAN device 102 waits for NAN device information of another NAN device and does not perform forwarding processing. That is, the NAN device 102 waits for an extended Publish message and an extended Follow-up message from the DW period 920 in which the extended Subscribe message is transmitted in step S904 to the next DW period, namely, a DW period 921 and a DW period 922.

The procedure from steps S905 to S908 is the same as in FIG. 4, and thus detailed description thereof is omitted. Note however that the NAN device 103 and the NAN device 104 execute, after having transmitted the extended Subscribe message, the flowchart of FIG. 10 to determine the waiting time for receiving an extended Publish message and an extended Follow-up message. Here, since Hop Count=1 and Hop Count Limit=2, the NAN device 103 and the NAN device 104 do not wait for information from another NAN device (0×DW period). In the case of "0 DW period", the NAN device 103 and the NAN device 104 are controlled to wait for an extended Publish message and an extended Follow-up message only during the current period, namely, the DW period 921, and transmit the received NAN device information collectively in the next DW period 922 (step S1003).

The procedure from steps S909 and S910 is the same as in the first embodiment, and thus detailed description thereof is omitted. In the DW period 922, the NAN device 103 and the NAN device 104 transmit an extended Follow-up message at the start of the DW period in accordance with the flow of steps S1001, S1002, and S1003 of FIG. 10 (steps S911 and S912). Note that the information stored in the extended Follow-up message is the same as that in the first embodiment.

In a DW period 923, the NAN device 102 transmits an extended Follow-up message at the start of the DW period in accordance with the flow of steps S1001, S1002, and S1003 (step S913). The extended Follow-up message includes all other pieces of NAN device information received by the NAN device 102 before. Accordingly, the NAN device 102 transmits the extended Follow-up message with the NAN device information of the NAN devices 103, 104, 105, and 106 included in the messages received in steps S905, S906, S911, and S912 stored.

Thus, according to the present embodiment, as a result of the NAN device 102 transmitting other received pieces of NAN device information collectively, it is possible to reduce the occupancy of the used wireless band. In contrast to the first embodiment, the NAN device 102 determines the waiting time for receiving NAN device information based on "Hop Count" and "Hop Count Limit". Accordingly, larger pieces of NAN device information are likely to be transmitted at a time than in the first embodiment, and thus it is easy to prevent the band occupancy. On the other hand, in the Second embodiment, if a large value is assigned to "Hop Count Limit" but the NAN devices that corresponds to this number of hops do not exist in the NAN cluster, it unnecessarily takes time to acquire NAN device information. In this view, in the first embodiment, the waiting time for receiving NAN device information is determined irrespective of "Hop Count Limit", and thus the NAN device that has requested NAN device information is likely to receive NAN device information more rapidly.

Modification

The first embodiment and the second embodiment may be combined with each other. The second embodiment has the problem that if a large value is assigned to "Hop Count Limit", it unnecessarily takes time to acquire information of another NAN device. Accordingly, if a certain value or greater is assigned to "Hop Count Limit" or (Hop Count Limit−Hop Count), the NAN device 102 determines the waiting time in accordance with the flowchart of FIG. 4. On the other hand, if a value smaller than the certain value is assigned to "Hop Count Limit" or (Hop Count Limit−Hop Count), the NAN device 102 may be configured to determine the waiting time in accordance with the flowchart of FIG. 10. This measure reduces the likelihood that it unnecessarily takes time to acquire NAN device information if a large value is assigned to "Hop Count Limit", and can make it easy to put together a plurality of pieces of NAN device information if a small value is assigned to "Hop Count Limit".

Furthermore, in FIGS. 5 and 10, the extended Follow-up message is controlled to be transmitted at the start of the next DW period, but the timing at which an extended Follow-up message is transmitted is not limited to this. For example, when an extended Follow-up message is controlled to be transmitted at the last of the DW period prior to the next DW period, the NAN device that has requested NAN device information can collect NAN device information more rapidly.

Furthermore, in the foregoing embodiments, the NAN device may also be controlled to be able to receive an extended Publish message or an extended Follow-up message not only in DW periods but also other periods. In this case, as a result of "Further NAN Service Discovery Attribute", which is defined according to the NAN standard, being included in an extended Subscribe message, the NAN device can communicate the period in which a frame can be transmitted and received, other than DW periods. The NAN device that has received it can transmit an extended Publish message or an extended Follow-up message in a period other than the DW period that is designated with "Further NAN Service Discovery Attribute".

Furthermore, in the foregoing embodiments, a NAN device transmits, upon receiving an extended Subscribe message, an extended Publish message with its NAN device information included therein, and then forwards an extended Subscribe message. In contrast, it is also possible that the NAN device first forwards an extended Subscribe message and then transmits its NAN device information with an extended Publish message. Alternatively, it is also possible that, after a response to the forwarded extended Subscribe message is returned from another NAN device, the NAN device transmits a response to the received extended Subscribe message as an extended Follow-up message. That is, in the example of FIG. 9, the NAN device 102 may add its own NAN device information to an extended Follow-up message in step S913, instead of making a response in step S903. Furthermore, at this time, the NAN device 102 can add NAN device information of the NAN devices 102 to 106 to an extended Publish message, instead of an extended Follow-up message.

Furthermore, in FIGS. 7 and 8, "NAN device information" included in an extended Publish message and an extended Follow-up message is stored in "Service Info". However, "NAN device information" may be included in another field of the frame. "Service Info" can store data of up to 256 bytes in the NAN standard, and thus if NAN device information has a larger size, the NAN device information needs to be transmitted using a field other than "Service Info". For example, "Vendor Specific Attribute", which is a value freely assigned by each vender and is compliance with the NAN standard, may be used. As a further modification, if NAN device information of 256 bytes or more in total is received from a plurality of NAN device, a NAN device may also transmit an extended Follow-up message within a range of 256 bytes at this time.

Furthermore, in the Second embodiment, in contrast to the first embodiment, the NAN device waits for receiving information of another NAN device only in a fixed period, even if an extended Follow-up message or Publish message is received at the last of the waiting time. However, for example, in the case that corresponds to steps S502 and S504, it is also possible that the NAN device further waits for the next DW period.

According to the foregoing embodiments, thus, the NAN device can efficiently acquire NAN device information of another NAN device existing in the NAN cluster in which it participates, realizing a reduction in the radio band occupancy. Accordingly, it is possible for a NAN device to efficiently acquire NAN device information of a NAN device that does not exist in the coverage of radio waves of that NAN device, and to discover a service. Furthermore, even if a NAN device having a large number of hops from the NAN device moves within the NAN cluster, it is highly possible that that NAN device can continuously discover a service.

It is possible to reduce the radio band occupancy when information relating to another communication apparatus that exists in a cluster is acquired.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
one or more processors; and
one or more memories including instructions that, when executed by the one or more processors, cause the apparatus to:
receive a first acquisition request, which is a request for acquiring apparatus information relating to another communication apparatus that belongs to a NAN (Neighbor Awareness Networking) cluster to which a first other communication apparatus belongs and includes service information indicating a predetermined service, from the first other communication apparatus;
transmit, in a case where the first acquisition request is received, a second acquisition request that corresponds to the first acquisition request and includes the received service information to the cluster;
await reception of signals from a plurality of other communication apparatuses in response to the transmitted second acquisition request, for a predetermined period; and
transmit, in a case of receiving the signals from each of at least a second other communication apparatus and a third other communication apparatus during the predetermined period, a signal which includes at least apparatus information of the second other communication apparatuses and apparatus information of the third other communication apparatus that are included in the received signals.

2. The communication apparatus according to claim 1, wherein the instructions further cause the apparatus to determine the predetermined period.

3. The communication apparatus according to claim 2, wherein the instructions further cause the apparatus to determine the predetermined period based on frequency information relating to the number of times that a request corresponding to the first acquisition request is transmitted.

4. The communication apparatus according to claim 3, wherein the frequency information is included in the first acquisition request.

5. The communication apparatus according to claim 2, wherein, in a case where a signal is received from any one of the other communication apparatuses in a latter half of a Discovery Window period of the cluster, the instructions further cause the apparatus to determine, as the predetermined period, time that includes a next Discovery Window period of the Discovery Window period in which the signal has been received.

6. The communication apparatus according to claim 1, wherein the instructions further cause the apparatus to receive the first acquisition request during a Discovery Window period of the cluster.

7. The communication apparatus according to claim 1, wherein the instructions further cause the apparatus to transmit the second acquisition request during a Discovery Window period of the cluster.

8. The communication apparatus according claim 1, wherein the instructions further cause the apparatus to await, during a Discovery Window period of the cluster, reception of signals from the other communication apparatuses in response to the second acquisition request.

9. The communication apparatus according to claim 1, wherein the instructions further cause the apparatus to transmit, during a Discovery Window period of the cluster, the signal which includes at least apparatus information of the second other communication apparatuses and apparatus information of the third other communication apparatus that are included in the received signals.

10. The communication apparatus according to claim 1, wherein the apparatus information includes information relating to a service provided by the other communication apparatus.

11. The communication apparatus according to claim 1, wherein the apparatus information includes information relating to a role of the other communication apparatus in the cluster.

12. The communication apparatus according to claim 1, wherein the predetermined service is a service for requesting the apparatus information.

13. The communication apparatus according to claim 1, wherein the service information is service ID indicating the predetermined service.

14. A control method for a communication apparatus, the method comprises:
- receiving a first acquisition request, which is a request for acquiring apparatus information relating to another communication apparatus that belongs to a NAN (Neighbor Awareness Networking) cluster to which a first other communication apparatus belongs and includes service information indicating a predetermined service, from the first other communication apparatus;
- transmitting, in a case where the first acquisition request is received, a second acquisition request that corresponds to the first acquisition request and includes the received service information to the cluster;
- awaiting reception of signals from a plurality of other communication apparatuses in response to the transmitted second acquisition request, for a predetermined period; and
- transmitting, in a case of receiving the signals from each of at least a second other communication apparatus and a third other communication apparatus during the predetermined period, a signal which includes at least apparatus information of the second other communication apparatuses and apparatus information of the third other communication apparatus that are included in the received signals.

15. A non-transitory computer-readable storage medium storing a program for causing a computer to perform control of a communication apparatus, the program causes the computer to:
- receive a first acquisition request, which is a request for acquiring apparatus information relating to another communication apparatus that belongs to a NAN (Neighbor Awareness Networking) cluster to which a first other communication apparatus belongs and includes service information indicating a predetermined service, from the first other communication apparatus;
- transmit, in a case where the first acquisition request is received, a second acquisition request that corresponds to the first acquisition request and includes the received service information to the cluster;
- await reception of signals from a plurality of other communication apparatuses in response to the transmitted second acquisition request, for a predetermined period; and
- transmit, in a case of receiving the signals from each of at least a second other communication apparatus and a third other communication apparatus during the predetermined period, a signal which includes at least apparatus information of the second other communication apparatuses and apparatus information of the third other communication apparatus that are included in the received signals.

* * * * *